UNITED STATES PATENT OFFICE 2,580,901

COPOLYMER OF STYRENE, GLYCIDYL ACRYLATE, AND GLYCIDYL METHACRYLATE

John G. Erickson, Greenwich, and Walter M. Thomas, Stamford, Conn., assignors to American Cyanamid Company, New York, N. Y., a corporation of Maine No Drawing. Application June 19, 1948, Serial No. 34,143

1 Claim. (Cl. 260—86.7)

This invention relates to new and useful compositions of matter and more particularly to polymerizable and polymerized glycidyl ester compositions. The invention is especially concerned with polymerizable compositions comprising (1) a compound represented by the general formula

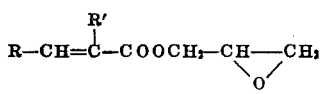

where R and R' each represents a member of the class consisting of hydrogen and the methyl radical, R' representing hydrogen when R represents a methyl radical, more particularly glycidyl acrylate, glycidyl methacrylate and glycidyl crotonate, and (2) a compound which is different from the compound of (1), is copolymerizable therewith and which contains a $CH_2=C<$ grouping, e. g., styrene, vinyl acetate, ethyl acrylate, diallyl phthalate, acrylonitrile, acrylamide, etc.; and with products of polymerization, including reactive (reactable) products of polymerization, of the said polymerizable compositions. More particularly the invention claimed herein is directed to a copolymer of styrene, glycidyl methacrylate and glycidyl acrylate, and specifically to a three-component copolymer of the aforementioned compounds in the following specified weight ratios: 360 parts of styrene, 30 parts of glycidyl methacrylate and 10 parts of glycidyl acrylate. The unsaturated glycidyl compounds used in practicing the present invention are polymerizable materials which can be caused to polymerize either through the ethylenically unsaturated bond of the compound (more particularly through a vinyl grouping in the case of glycidyl acrylate) or through both the unsaturated linkage and the epoxy grouping. These monomers and polymers thereof are more fully described in the copending application of John G. Erickson, Serial No. 34,142, filed concurrently herewith, now Patent No. 2,556,075, issued June 5, 1951. As is stated in this copending application, at least two different methods may be employed to produce monomeric chemical compounds of the kind embraced by Formula I. For example, they may be prepared by effecting reaction between epichlorohydrin and an alkali-metal (sodium, potassium, lithium, rubidium or caesium) salt, preferably the potassium salt, of acrylic acid, methacrylic acid or crotonic acid, the reaction advantageously being effected in the presence of a material which is adapted to inhibit polymerization through the ethylenically unsaturated grouping, more particularly a vinyl-type polymerization inhibitor. Reference is made to the aforementioned copending Erickson application Serial No. 34.142 for additional details with regard to this method of preparing glycidyl esters of the kind embraced by Formula I; and to Erickson application Serial No. 34,141, also filed concurrently herewith, now Patent No. 2,567,842, dated September 11, 1951, for a description of another method by which they may be prepared.

Many different vinyl compounds and esters of acrylic, methacrylic and crotonic acids were known prior to our invention, as well as polymerizable compositions comprising such monomers alone and with one or more other compounds containing a $CH_2=C<$ grouping, and also polymers and copolymers resulting from the polymerization of such monomers or mixtures of monomers. Likewise, a few saturated esters of glycidol have been mentioned in the literature. Glycidyl compounds of the kind embraced by Formula I are unique in that, as was mentioned in the second paragraph of this specification, they can be caused to polymerize either through the ethylenically unsaturated grouping or through both the unsaturated linkage and the epoxy grouping. Also, by suitable choice of a catalyst, polymerization can be caused to take place primarily through the epoxy grouping.

As is pointed out in the copending Erickson application Serial No. 34,142, glycidyl compounds of the kind covered by Formula I provide the plastics chemist and resin formulator, and workers in related arts, with a single polymerizable material which can be caused to undergo either or both of two types of polymerization reactions as briefly described in the preceding paragraph. The advantages of such a polymerizable compound will be apparent to those skilled in the art, for example, the greater adaptability of such compounds for a wider variety of service applications by merely varying the catalyst or other polymerization influences employed, so as to direct the course of the polymerization through the ethylenic linkage and/or the epoxy grouping as desired or as conditions may require.

The present invention is based on our discovery that new and useful classes of polymerizable compositions and polymerized products, including reactive polymerization products, can be prepared by compounding, as for example by forming a homogeneous or substantially homogeneous mixture or blend, of a glycidyl ester of the kind embraced by Formula I and a compound (or a plurality of compounds) which is different from the said glycidyl ester, is copolymerizable therewith and which contains a CH₂=C< grouping, that is, either a single CH₂=C< grouping or a plurality of CH₂=C< groupings, and then polymerizing the resulting mixture or blend as hereafter more fully described. The glycidyl ester and the other copolymerizable monomer may be employed in any proportions, the chosen proportions being dependent largely upon economic considerations and the intended use of the polymerization product, that is, the particular properties desired in the copolymer. Surprisingly it was found that copolymerization can be caused to take place primarily through the ethylenically unsaturated groupings of the respective comonomers, yielding a reactive copolymer which can be caused to polymerize further as a result of opening up or rupturing of the epoxy groupings present therein.

The present invention is an improvement upon that phase of the invention disclosed in Erickson application Serial No. 34,142 which is directed to polymers of glycidyl esters of the kind embraced by Formula I in that it provides polymerizable compositions and polymerized products (copolymers) in which less expensive comonomers may be used in conjunction with the more costly glycidyl esters, with obvious economic advantages, and yet obtain reactive copolymers which are capable of undergoing further polymerization through the epoxy groupings of the glycidyl component of the copolymer. Another advantage accruing from our invention is that it provides a relatively simple and economical means whereby copolymers having properties especially suited for a particular service application readily can be made, for example, by suitable selection of the comonomer, or by varying the proportions of the comonomer and the glycidyl ester, or by both such means. Because of their inherent chemical constitution and properties, polymeric glycidyl acrylate, methacrylate and crotonate do not have the same adaptability for modification of their properties that is characteristic of the compositions of our invention.

It is an object of the present invention to prepare a new class of polymerizable compositions, and more particularly a new class of polymerizable compositions at least one of the components of which contains at least two different types of polymerizable groupings.

Another object of the present invention is to provide a new class of polymerization products (copolymeric materials), including reactive copolymers, and more particularly such materials of the thermosetting (including potentially thermosetting) type or kind.

Another object of the invention is to prepare a new class of polymerizale compositions which can be cast and polymerized to yield copolymers in the form of hard castings.

Still another object of the invention is to prepare compositions, e. g., molding (moldable) compositions, from reactive copolymers which are capable of undergoing further polymerization.

A further object of the invention is to provide a method of preparing a new class of synthetic materials.

Other objects of the invention will be apparent to those skilled in the art from the following more detailed description.

The foregoing objects are fulfilled by the preparation and utilization (for example, as filled or unfilled molding compositions comprising a reactive copolymer) of polymerizable compositions comprising a glycidyl ester of the kind embraced by Formula I and at least one (e. g., one, two, three, four, five or more) other monomeric or partially polymerized substance which is different from the said glycidyl ester, is compatible (or capable of being rendered compatible) and copolymerizable therewith and which, in its monomeric form, contains at least one CH₂=C< grouping. A preferred class of glycidyl esters which are used in practicing the present invention are those represented by the formula II 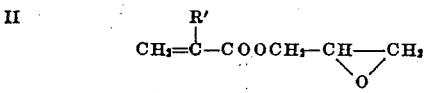

where R' represents a member of the class consisting of hydrogen and the methyl radical. Compounds embraced by Formula II are glycidyl acrylate and glycidyl methacrylate.

Examples of monomers containing a CH₂=C< grouping which may be copolymerized with glycidyl esters of the kind embraced by Formulas I and II to yield new and valuable copolymer compositions are such monomers as the unsaturated alcohol esters, more particularly the allyl, methallyl, crotyl, 1-chloroallyl, 2-chloroallyl, cinnamyl, vinyl, methvinyl, 1-phenylallyl, butenyl, propargyl, butynyl, etc., esters of saturated and unsaturated, aliphatic and aromatic, monobasic and polybasic acids such, for instance, as acetic, propionic, butyric, valeric, caproic, acrylic and alpha-substituted acrylic (including alkacrylic, e. g., methacrylic, ethacrylic, propacrylic, etc., and arylacrylic, e. g., phenylacrylic, etc.), crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e. g., the methyl, ethyl, propyl, isopropyl, butyl, sec.-butyl, amyl, etc., esters of unsaturated aliphatic monobasic and polybasic acids, illustrative examples of which appear above; vinyl cyclic compounds (including monovinyl aromatic hydrocarbons), e. g., styrene, o-, m- and p-chlorostyrenes, -bromostyrenes, -fluorostyrenes, -methylstyrenes, -ethylstyrenes, -cyanostyrenes, the various polysubstituted styrenes such, for example, as the various di-, tri- and tetra-chlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridine, vinyldibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e. g., alpha-methyl styrene, alpha-methyl-para-methyl styrene, etc.; unsaturated ethers, e. g., ethyl vinyl ether, diallyl ether, ethyl methallyl ether, etc.; unsaturated amides, for instance N-allyl caprolactam, acrylamide, and N-substituted acrylamides, e. g., N-methylol acrylamide, N-allyl acrylamide, N-methyl acrylamide, N-phenyl acrylamide, etc.; unsaturated ketones, e. g., methyl vinyl ketone, methyl allyl ketone, etc.; methylene malonic esters, e. g., methylene methyl malonate, etc.; butadienes, e. g., 1,3-butadiene, 2-chlorobutadiene, etc.; unsaturated polyhydric alcohol (e. g., butenediol, butyndiol, etc.) esters of saturated and unsaturated, aliphatic and aromatic, monobasic and polybasic acids, illustrative examples of which appear above.

Other examples of monomers that may be copolymerized with the glycidyl esters embraced by Formula I are the vinyl halides, more particularly vinyl fluoride, vinyl chloride, vinyl bromide and vinyl iodide, and the various vinylidene compounds, including the vinylidene halides, e. g., vinylidene chloride, vinylidene bromide, vinylidene fluoride and vinylidene iodide.

Further examples of monomers that may be copolymerized with the glycidyl esters embraced by Formula I are the cyanomethyl esters of unsaturated dicarboxylic acids, more particularly compounds embraced by the formula III  NC—CH₂OOC—CH=CR—COOCH₂—CN where R represents a member of the class consisting of hydrogen, chlorine and the methyl radical, specifically bis(cyanomethyl) fumarate, bis(cyanomethyl) mesaconate and bis(cyanomethyl) alpha-chlorofumarate; and cyanomethyl esters of unsaturated monocarboxylic acids, more particularly compounds embraced by the formula IV 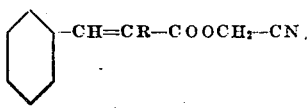

where R is a member of the class consisting of hydrogen and the methyl radical, specifically cyanomethyl cinnamate and cyanomethyl alpha-methylcinnamate.

Other and more specific examples of monomeric materials which may be mixed or blended with the glycidyl esters used in practicing our invention and the resulting homogeneous or substantially homogeneous, polymerizable composition then polymerized, as hereinafter more fully described, to yield new and valuable copolymer compositions are the allyl compounds and especially those which have a boiling point of at least about 60° C. of the monomeric materials which may be used the allyl esters form a large class, all of which are suitable. The reactive allyl compounds employed are preferably those which have a high boiling point such, for example, as diallyl maleate, diallyl fumarate, diallyl phthalate, diallyl succinate, etc. Other allyl compounds which are not necessarily high boiling also may be used.

More specific examples of allyl compounds that may be copolymerized with glycidyl esters of the kind embraced by Formula I are allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl azelate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetrallyl silane, tetrallyl silicate, hexallyl disiloxane, etc. Other examples of allyl compounds that may be employed are given, for example, in the copending application of Edward I. Kropa, Serial No. 700,833, filed October 2, 1946, now Patent No. 2,510,503, issued June 6, 1950.

Among the comonomers which are preferred for use in carrying our invention into effect are the vinyl compounds, including the vinyl aromatic compounds, more particularly the vinyl aromatic hydrocarbons (e. g., styrene, isopropenyl toluene, the various dialkyl styrenes, etc.), and the vinyl aliphatic compounds, e. g., acrylonitrile and the various substituted acrylonitriles (e. g., methacrylonitrile, ethacrylonitrile, phenylacrylonitrile, etc.), acrylamide and the various substituted acrylamides (e. g., methacrylamide, ethacrylamide, the various N-substituted acrylamides and alkacrylamides, for instance N-methylol acrylamide, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e. g., methacrylic acid, ethacrylic acid, phenylacrylic acid, etc.), more particularly the alkyl esters of an acrylic acid, e. g., the methyl, ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids, including the alkyl acrylates containing not more than four carbon atoms in the ester grouping, examples of which are given above, as well as other vinyl aromatic and vinyl aliphatic compounds.

The polymerizable compositions of this invention, and which contain as an essential ingredient glycidyl acrylate, glycidyl methacrylate or glycidyl crotonate, or any two or all three of these glycidyl esters, may be polymerized by any suitable method. Polymerization will often proceed merely by allowing the material to stand for a prolonged period, e. g., from 4 to 12 weeks or longer, at room temperature (20° to 30° C.). The polymerization is accelerated, for instance, by heating the mixture of monomers, e. g., at temperatures up to and including the boiling point of the monomeric mixture at atmospheric pressure, using reflux conditions or a pressure slightly above atmospheric if polymerization is effected at the boiling point of the monomeric mixture. Polymerization may be effected, if desired, at superatmospheric pressures ranging, for example, from 5 to 40 pounds per square inch above atmospheric, in which case the temperature of polymerization is slightly above the boiling point of the monomeric mixture.

Light also may be used to effect copolymerization between the copolymerizable ingredients of the polymerizable compositions of this invention, although the rate of polymerization (copolymerization) by this means is relatively slow. Ultraviolet light is more effective than ordinary light. A combination of heat and light usually causes more rapid copolymerization than light alone.

The copolymerization of the glycidyl ester (or esters) with the other copolymerizable comonomer containing at least one CH₂=C< grouping, or with a plurality (e. g., two, three, four or any desired number depending, for instance, upon the particular properties desired in the end product) of such comonomers which are compatible and copolymerizable with the glycidyl ester, is preferably accelerated by incorporating a single or a plurality of polymerization catalysts in the mixture of monomers or partial polymers. The polymerization catalyst may be so chosen as to cause the copolymerization to proceed wholly or mainly through the ethylenically unsaturated groupings of the ester and comonomer which are present in the polymerizable composition. In this way there is produced a reactive copolymer which then can be caused to polymerize further through opening up of the epoxy groupings which are present therein. If desired, partial copolymerization of the copolymerizable ingredients may be effected with the aid of one polymerization catalyst (e. g., a peroxide and, more particularly, an organic peroxide catalyst) and polymerization then completed with the aid of a catalyst capable of opening up the epoxy groupings, e. g., stannic chloride, etc.

Any of the polymerization catalysts which are suitable for use in polymerizing compounds containing an ethylenically unsaturated grouping, specifically a vinyl grouping, may be employed. Hydrogen peroxide and other peroxide catalysts may be used. Among the preferred catalysts are: the acidic peroxides, e. g., benzoyl peroxide, phthalic peroxide, succinic peroxide and benzoyl acetic peroxide, as well as fatty oil acid peroxides, e. g., coconut oil acid peroxides, lauric peroxide, stearic peroxide and oleic peroxide; alcoholic peroxides, e. g., tert.-butyl hydroperoxide; and terpene oxides, e. g., ascaridole. Other more specific examples of organic peroxide catalysts that may be employed are the following:

Tetralin hydroperoxide
Tert.-butyl diperphthalate
Cumene hydroperoxide
Tert.-butyl perbenzoate
Acetyl peroxide
2,4-dichlorobenzoyl peroxide
Urea peroxide
Caprylyl peroxide
p-Chlorobenzoyl peroxide
Di-tert.-butyl peroxide
2,2-dis(tert.-butyl peroxy)butane
Hydroxyheptyl peroxide
Diperoxide of benzaldehyde Examples of catalysts which accelerate polymerization primarily by opening up of the epoxy grouping of the glycidyl ester are: p-toluene sulfonic acid, sulfuric acid, phosphoric acid, aluminum chloride, stannic chloride, ferric chloride, boron trifluoride, boron trifluoride-ethyl ether complex, iodine, etc.

The concentration of the catalyst employed is usually small, that is, for the preferred catalysts from, by weight, about 1 part of catalyst per thousand parts of the polymerizable composition (mixture of copolymerizable materials) to be polymerized to about 3 or 4 parts of catalyst per 100 parts of the mixture of comonomers. If an inhibitor of the kind hereinafter mentioned be present, up to 6 or 7% or even more, based on the weight of the polymerizable composition, may be necessary according to the concentration of the inhibitor.

When polymerization of our polymerizable compositions takes place in the absence of a polymerization catalyst, it is believed that spontaneous copolymerization occurs through the ethylenically unsaturated groups, more particularly the vinyl groups, but that cross-linking through the epoxy groups also takes place to a considerable degree. Heat and ultraviolet light accelerate these reactions but do not appear to be selective. The so-called "free radical" type of catalysts, e. g., the peroxide catalysts, are more or less specific toward copolymerization through the ethylenically unsaturated groupings, leaving the epoxy rings mainly in an unchanged and reactive condition. Ionic catalysts, e. g., stannic chloride, boron trifluoride etherate, etc., are more or less specific toward polymerization through the epoxy groupings, and are believed not to affect the double bond in the unsaturated ester grouping of the glycidyl ester.

The proportions of the glycidyl ester and monomeric material which is copolymerized therewith may be varied as desired or as conditions may require, but ordinarily the proportions thereof in the polymerizable mixture will be within the range of, by weight, from 1% (about 1%) to 90% (about 90%), more particularly from 2 or 3% (about 2 or 3%) to 70 or 80% (about 70 or 80%) of the former to from 97 to 98% (about 97 or 98%) to 20 or 30% (about 20 or 30%) of the latter. Surprisingly, a very small amount of glycidyl ester of the order of from 1 to 3% by weight of the polymerizable composition, and which in some cases may be even less than 1%, e. g., about 0.5%, by weight of the polymerizable composition, causes a marked change in the properties of the polymerized product as compared with the same polymeric material which has been polymerized in the same manner except that polymerization was effected in the absence of the glycidyl ester. The glycidyl ester may be present in the polymerizable composition in an amount, by weight, above 90% (e. g., 95–97% or more) that of the mixture of copolymerizable ingredients, but no particular advantages ordinarily accrue therefrom and economic advantages are lost by using such higher proportions of the glycidyl ester. Furthermore, when the comonomer constitutes only 2 or 3% by weight of the polymerizable composition and the glycidyl ester constitutes the remainder, the changes in the properties of the polymerization product are less marked (as compared with polymeric glycidyl acrylate, methacrylate or crotonate) than when the comonomer constitutes a substantially larger amount, as for example 10 or 20% or even as much as 30 or 40% by weight of the polymerizable composition.

Particularly useful products of this invention are reactive (reactable) copolymers which contain epoxy groupings and which are products of polymerization of a polymerizable mixture of copolymerizable ingredients including (1) a compound (or a plurality of compounds) of the kind embraced by Formula I and (2) a compound (or plurality of compounds) which is different from the compound of (1) and which contains a $CH_2=C<$ grouping, that is, either a single $CH_2=C<$ grouping or a plurality (e. g., two, three, four or more) of $CH_2=C<$ groupings, the compounds of (1) and (2) being present in the polymerizable mixture in the ratio of, by weight, from 3 (about 3) to 80 (about 80) parts of the former to from 97 (about 97) to 20 (about 20) parts of the latter.

For some applications it is desirable that the maximum amount of glycidyl ester which is present in the mixture of copolymerizable ingredients be even less than the maximum hereinbefore indicated, e. g., of the order of 30 or 40%, or sometimes up to 50% (or slightly above 50%), by weight of the mixture of copolymerizable ingredients. Usually, however, the amount of glycidyl ester (glycidyl acrylate, glycidyl methacrylate or glycidyl crotonate or mixture thereof) which is employed is relatively small, e. g., from 1-3% up to 15-20%, more particularly about 5 or 10%, by weight of the polymerizable mixture, the other comonomer or comonomers which are employed (numerous examples of which have been given hereinbefore) constituting the remainder of the polymerizable mass.

The polymerization may be effected by conventional bulk polymerization technique, in the presence or absence of a solvent capable of dissolving the monomeric material (mixture of monomers) and in which the latter preferably is inert; or by conventional emulsion polymerization or bead polymerization methods. The copolymerization of the mixture of monomers or partial polymers may be effected by a continuous process as well as by a batch operation. Thus the monomeric mixture containing a trace of a catalyst may be passed through a conduit with alternate hot and cool zones.

The temperature of polymerization of the polymerizable composition, at atmospheric or slightly above atmospheric pressure and in the presence or absence of a polymerization catalyst, may be varied over a wide range, up to and including or slightly above the boiling point (at atmospheric pressure) of the monomeric material as previously has been more fully described. In most cases the polymerization temperature will be within the range of 15° C. to 140° C., more particularly within the range of 20° C. or 30° C. (ordinary room temperature) to 130° C., depending upon the particular mixture of comonomers employed, the particular catalyst, if any, used, the rapidity of copolymerization wanted, and other influencing factors. With certain catalysts, more particularly strong acidic polymerization catalysts such, for instance, as gaseous boron trifluoride, boron trifluoride-ethyl ether complex, concentrated sulfuric acid, anhydrous aluminum chloride, etc., a substantially lower copolymerization temperature often advantageously may be used, e. g., temperatures ranging between —80° C. and 0° C. or 10° C. At the lower temperatures below the solidification point of the monomeric mixture (or components thereof), copolymerization is effected while the mixture of monomers is dissolved or dispersed in a solvent or dispersion medium which is liquid at the temperature of copolymerization. Or, if desired, the monomeric mixture, that is, the polymerizable composition, may be polymerized in dissolved or dispersed state at temperatures above its solidification point or above the solidification point of the copolymerizable components thereof. The copolymer may be separated from the liquid medium in which copolymerization was effected by any suitable means, e. g., by filtration, centrifuging, solvent extraction, etc.

In some cases it may be desirable to incorporate into the polymerizable composition an inhibitor which is adapted to inhibit copolymerization through the ethylenically unsaturated grouping of the individual monomers present in the composition. When it is desired to use the inhibitor-modified composition, a catalyst is added in an amount sufficient to promote the copolymerization reaction between the comonomers and to yield a copolymer. Any suitable inhibitor of the aforementioned type or kind may be used, e. g., phenyl-α-napththylamine, N,N'-di-2-naphthyl-p-phenylenediamine, certain cupric salts, e. g., cupric acetate, etc. The amount of the polymerization (copolymerization) inhibitor may be considerably varied but ordinarily it is employed in an amount not exceeding 3%, generally less than 1%, by weight of the mixture of comonomers, e. g., from 0.01% to 0.5% or 0.6% by weight of the said mixture.

The polymerizable compositions of our invention which are normally liquids may be cast at normal temperatures in film or bulk form. Upon being subjected to polymerization conditions as above described, hard copolymeric films or massive castings are obtained. Alternatively, the polymerizable compositions may be partially polymerized, mainly through the ethylenically unsaturated groupings of the respective comonomers, to yield a solid thermosetting (or potentially thermosetting) copolymer. This copolymer, alone or with a modifier or a plurality of modifiers, e. g., a pigment, dye, opacifier, filler, polymerization catalyst, plasticizer, mold lubricant, etc., may be used in the production of molding compositions from which molded articles of any desired shape may be fabricated. Molding is effected under heat and pressure. During molding, cross-linking takes place as a result of opening up the epoxy grouping of the reactive copolymer under the heat of molding and/or the influence of a polymerization catalyst that may have been incorporated into the molding composition in order to promote or accelerate this effect. In this way there can be produced molded articles formed of filled or unfilled copolymer cured to an insoluble, infusible or insoluble and infusible state.

Particularly valuable thermosetting molding compositions of this invention are those which comprise a solid, reactive copolymer which contains epoxy groupings and which is a product of polymerization of a polymerizable mixture of copolymerizable ingredients including (1) a compound of the kind embraced by Formula I, specifically glycidyl acrylate, glycidyl methacrylate and glycidyl crotonate (or mixtures thereof) and (2) a compound which contains a single $CH_2=C<$ grouping (e. g., styrene, methyl methacrylate, vinyl acetate, acrylonitrile, acrylamide, vinyl chloride, vinylidene chloride, etc.) and which is different from the compound of (1), the compounds of (1) and (2) being present in the polymerizable mixture in the ratio of, by weight, from 5 (about 5) to 25 (about 25) parts of the former to from 95 (about 95) to 75 (about 75) parts of the latter.

When organic peroxide polymerization catalysts are employed, the unfilled castings or moldings of the polymerizable compositions of this invention are usually clear or substantially clear, colorless or nearly colorless, and at an advanced stage of copolymerization are hard, tough copolymers having considerable resistance to abrasion.

The reactive, thermosetting (or potentially thermosetting) copolymers of this invention, and more particularly those copolymers which are capable of undergoing further polymerization through opening up of the epoxy groupings, are particularly valuable in the plastics arts, e. g., in the production of filled or unfilled molding compositions from which latter molded articles are produced by molding the composition under heat and pressure as hereafter more fully described. In such copolymeric materials, copolymerization through the vinyl groupings of the monomers may or may not have proceeded to substantial completion, depending upon the extent of copolymerization that was desired and which is attained by suitable control of the polymerization conditions, e. g., kind of polymerization catalyst used, time and temperature of copolymerization, etc. Further polymerization of the reactive copolymer through opening up of the epoxy groupings then can be effected, e. g., during a molding operation, either by means of heat alone, a polymerization catalyst alone, or by the use of both heat and a polymerization catalyst.

Any suitable temperature may be used to rupture the epoxy groupings of the reactive copolymers, but usually the temperatures required, when heat alone is used to accelerate copolymerization, are higher than those which will cause the glycidyl ester component of the polymerizable composition to polymerize through its epoxy grouping. For example, in the absence of a polymerization catalyst, a temperature of at least 105° C. is generally required in order to open up the epoxy grouping of a reactive copolymer of this invention and thereby to effect further polymerization of the material within a reasonable time. The polymerization proceeds more rapidly through the epoxy grouping as higher temperatures are used, e. g., 110° or 120° C. to 200° C. or higher and, also, if a polymerization catalyst adapted to accelerate polymerization through the epoxy grouping, examples of which catalysts have been given hereinbefore, be incorporated into the reactive copolymer prior to the heat treatment. Polymerization of the reactive copolymer at normal temperatures also may be effected by using a polymerization catalyst alone.

In order that those skilled in the art better may understand how the present invention may be carried into effect, the following examples are given by way of illustration and not by way of limitation. All parts and percentages are by weight.

Example 1

| | Parts |
|---|---|
| Styrene | 180.0 |
| Glycidyl methacrylate | 20.0 |
| 25% solution of dioctyl sodium sulfosuccinate in water | 20.0 |
| Water | 580.0 |
| Ammonium persulfate | 0.1 |

The above ingredients are charged to a three-neck reaction vessel equipped with a stirrer and a reflux condenser. The mixture is stirred vigorously while heating on a steam bath for 80 minutes, at the end of which period refluxing has ceased. Steam is now passed through the emulsion for 15 minutes to remove residual monomers. A small amount of coagulated copolymer is filtered out of the stable emulsion of the copolymer of styrene and glycidyl methacrylate. The conversion of monomers to a reactive copolymer is about 95%.

The copolymer latex may be used as a coating composition or as a component of such compositions. For example, it may be applied to a surface of glass, metal, wood or other material to be protectively finished, and the coated article then heated for from 1 to 3 hours at a temperature of the order of 120° C. to 140° C. to evaporate the water and to convert the reactive styrene-glycidyl methacrylate copolymer to a cured or substantially insoluble, substantially infusible state.

The copolymer may be precipitated, if desired, from the aqueous emulsion thereof by adding a coagulating agent such, for instance, as salts (e. g., salts of polyvalent metals such as aluminum sulfate, magnesium chloride, barium chloride, etc., salts of monovalent metals such as sodium chloride, sodium sulfate, etc.), acids, e. g., formic acid, acetic acid, phosphoric acid, hydrochloric acid, etc., sulfides, e. g., magnesium sulfide, etc. The coagulated copolymer is separated from the aqueous phase, water-washed, and freed from entrapped water, for example by working on rolls to press out the water, followed by drying at a suitable temperature (e. g., at room temperature) under atmospheric pressure (preferably in a stream of dry air) or at subatmospheric pressures to remove the last traces of water. The dried, reactive copolymer, alone or with a dye, pigment, filler, plasticizer, lubricant, polymerization catalyst or other modifying agent, may be molded under heat and pressure, e. g., at 140° C. to 170° C. and under a pressure of 2000 to 5000 pounds per square inch, to yield molded articles of a desired shape.

Example 2

| | Parts |
|---|---|
| Acrylonitrile | 50.0 |
| Glycidyl methacrylate | 50.0 |
| 25% solution of dioctyl sodium sulfosuccinate in water | 12.0 |
| Water | 287.0 |
| 30% aqueous solution of hydrogen peroxide | 2.2 |

All of the above ingredients with the exception of one-half (1.1 parts) of the aqueous hydrogen peroxide solution are charged to a reaction vessel such as described under Example 1. The mixture is stirred vigorously while heating under reflux on a steam bath for 1½ hours, after which the remainder (1.1 parts) of the aqueous hydrogen peroxide solution is added to the reaction mass. Heating is continued under reflux for an additional 1½ hours, after which steam is passed through the emulsion for 15 to 20 minutes to remove residual monomers.

The emulsion is filtered and then frozen in a bath of acetone and Dry Ice (solid carbon dioxide). On rewarming, the emulsion is still quite stable, indicating that it has not been completely broken. About 30 parts of concentrated hydrochloric acid is added to the emulsion, which is then filtered to isolate the copolymer. The filter cake of copolymer is washed with water and dried in a vacuum oven at 50° C. for 48 hours, yielding a pale yellow, horny, lumpy mass of reactive copolymer of acrylonitrile and glycidyl methacrylate. It is translucent in thin sections. A Kjeldahl nitrogen analysis of a sample of the pulverized copolymer which has been dried over sulfuric acid shows 6.51% N, which corresponds to 24.6% of combined acrylonitrile in the copolymer.

The reactive copolymer of this example, alone or admixed with a filler, polymerization catalyst or other additive, is adapted to be molded under heat and pressure to yield molded articles of various shapes.

Example 3

| | Parts |
|---|---|
| Ethyl acrylate | 45.0 |
| Glycidyl acrylate | 5.0 |
| 25% solution of dioctyl sodium sulfosuccinate in water | 10.0 |
| Water | 190.0 |
| 30% aqueous solution of hydrogen peroxide | 0.55 |

The same general procedure is followed as described under Example 1. Stirring and heating under reflux are continued for 4½ hours, after which the emulsion is steamed for 1 hour to remove unpolymerized monomers. The resulting product is a fairly stable emulsion of reactive copolymer, which may be used, for example, as a coating composition or as a component of such compositions.

Example 4

| | Parts |
|---|---|
| Glycidyl methacrylate | 50.0 |
| Styrene | 50.0 |
| Benzoyl peroxide | 0.5 | are mixed together and charged to a heavy-walled glass tube, which thereafter is sealed under vacuum. Polymerization of the polymerizable mixture is allowed to proceed for 400 hours at room temperature (20° to 30° C.) and then for 15 days at 60° C. A very hard, clear, homogeneous, bubble-free, crack-free copolymer of glycidyl methacrylate and styrene is obtained.

Example 5

| | Parts |
|---|---|
| Glycidyl methacrylate | 95.0 |
| Styrene | 5.0 |
| Benzoyl peroxide | 0.5 |

The same procedure is followed as described under Example 4. The resulting glycidyl methacrylate-styrene copolymer is very hard and clear, and is free from bubbles and cracks.

Example 6

Same as Example 4 with the exception that 50 parts of glycidyl acrylate is used in place of 50 parts of glycidyl methacrylate. The resulting copolymer is not quite so hard as the copolymer of Example 4.

Example 7

Same as Example 5 with the exception that 95 parts of glycidyl acrylate is used instead of 95 parts of glycidyl methacrylate. The copolymer thereby obtained is softer than the copolymer of Example 5.

Example 8

| | Parts |
|---|---|
| Glycidyl crotonate | 25.0 |
| Acrylonitrile | 25.0 |
| Benzoyl peroxide | 0.5 | are mixed together and charged to a heavy-walled glass tube, which thereafter is sealed under vacuum. Copolymerization is effected by heating the sealed tube in a 60° C. water bath for 40 hours. The resulting copolymer is a soft, white, powdery material.

Example 9

| | Parts |
|---|---|
| Glycidyl crotonate | 25.0 |
| Ethyl acrylate | 25.0 |
| Benzoyl peroxide | 0.5 |

The same procedure is followed as described under Example 8 with the exception that the period of heating in the 60° C. bath is only 18 hours instead of 40 hours. The glycidyl crotonate-ethyl acrylate copolymer thereby obtained is a clear, homogeneous, colorless, gummy mass. It is capable of undergoing further polymerization through the epoxy groups which are present therein. Such polymerization can be effected by adding thereto a small amount, e. g., 0.3%, by weight of the copolymer, of boron trifluoride-ethyl ether complex, and warming the resulting mixture for a few minutes.

Example 10

| | Parts |
|---|---|
| Glycidyl methacrylate | 25.0 |
| Methyl methacrylate | 25.0 |
| Benzoyl peroxide | 0.5 |

The same procedure as in Example 8 and heating time as in Example 9 are employed. A very hard, clear, homogeneous, very pale pink-colored copolymer of glycidyl methacrylate and methyl methacrylate is obtained.

Example 11

| | Parts |
|---|---|
| Glycidyl methacrylate | 25.0 |
| Vinyl acetate | 25.0 |
| Benzoyl peroxide | 0.5 | yield a very hard, clear, homogeneous, colorless copolymer when copolymerized in the same manner as described in Example 10.

Example 12

| | Parts |
|---|---|
| Glycidyl methacrylate | 25.0 |
| Vinylidene chloride | 25.0 |
| Benzoyl peroxide | 0.5 | yield a clear, homogeneous, very pale yellow copolymer when polymerized in the same manner as described under Example 10.

Example 13

| | Parts |
|---|---|
| Ethyl acrylate | 45.0 |
| Glycidyl methacrylate | 5.0 |
| Cationic emulsifying agent, specifically cetyl dimethyl benzyl ammonium chloride | 2.5 |
| Water | 197.0 |
| Aqueous solution of hydrogen peroxide (30% $H_2O_2$) | 0.55 |

The emulsifying agent is dissolved in a portion of the water, and then diluted with additional water. The mixed ingredients are stirred vigorously for 3 hours while heating under reflux on a steam bath as described under Example 1. At the end of this period refluxing has stopped, indicating that copolymerization is substantially complete. The resulting emulsion is cooled and filtered, yielding a stable, viscous emulsion of reactive copolymer. This emulsion may be used as a coating composition or as a component of coating compositions, or the reactive copolymer may be precipitated as described under Examples 1 and 2. The precipitated copolymer, in dry state, is clear and flexible, and can be formed into a self-supporting film. It is heat-convertible to a cured or substantially insoluble, substantially infusible state as a result of opening up of the epoxy groupings of the copolymer.

Example 14

| | Parts |
|---|---|
| Ethyl acrylate | 70.0 |
| Glycidyl methacrylate | 30.0 |
| 25% solution of dioctyl sodium sulfosuccinate in water | 9.0 |
| Water | 233.0 |
| Ammonium persulfate | 0.1 | are heated together with stirring and under reflux for 1 hour on a steam bath as described under Example 1. The resulting emulsion is steamed to remove any residual monomers, after which it is cooled and filtered. The conversion of monomers to a reactive copolymer is about 93%. The emulsion may be used, or it may be further processed if desired, as described under Example 13. The dried, isolated copolymer is clear, flexible, heat-convertible to a substantially insoluble, substantially infusible state, and can be formed into a self-supporting film.

Example 15

| | Parts |
|---|---|
| Ethyl acrylate | 120.0 |
| Glycidyl methacrylate | 80.0 |
| Sodium lauryl sulfate (emulsifying agent) | 1.5 |
| Water | 300.0 |
| Ammonium persulfate | 0.1 |

A mixture of the first two ingredients is added dropwise to the water containing the sodium lauryl sulfate and ammonium persulfate over a period of 23 minutes, while stirring the latter and heating under reflux on a steam bath. Heating with stirring under reflux is continued for an additional 37 minutes. The resulting emulsion is cooled and diluted with water to 800 parts, the emulsion remaining substantially homogeneous upon dilution. The conversion of monomers to a reactive copolymer is about 97%. The emulsion as initially obtained may be used, or it may be further processed if desired, as described under Example 13. The properties of the dried, isolated, reactive copolymer are approximately the same as the reactive copolymer of Example 14.

Example 16

| | Parts |
|---|---|
| Styrene | 190.0 |
| Glycidyl methacrylate | 10.0 |
| Sodium lauryl sulfate | 3.0 |
| Water | 297.0 |
| Ammonium persulfate | 0.1 |

The water containing the ammonium persulfate and sodium lauryl sulfate is heated in a reaction vessel fitted with a reflux condenser, which vessel is placed on a steam bath, and about one-half of the mixture of monomers is then added to the stirred and heated water over a period of about 5 minutes. The remainder of the mixture of styrene and glycidyl methacrylate is then added over a period of about 15 minutes. At the end of this period the emulsion is quite fluid, but it suddenly becomes very viscous and foams. Heating under reflux is continued for an additional 10 minutes, after which the emulsion is cooled by means of a bath of ice water. A small amount of reactive copolymer precipitates upon diluting the emulsion with water to 800 parts. The conversion of monomers to a reactive copolymer is about 97%. If desired, all of the reactive copolymer may be coagulated as described under Examples 1 and 2. The coagulated copolymer, in dry state, is a hard and brittle resinous material. It may be ground and molded under heat and pressure, alone or with a filler or other effect agent, to yield molded articles of various shapes. The reactive copolymer is heat-curable to a substantially insoluble, substantially infusible state as a result of polymerization through the epoxy groupings of the copolymer.

Example 17

| | Parts |
|---|---|
| Styrene | 90.0 |
| Glycidyl methacrylate | 10.0 |
| 25% solution of dioctyl sodium sulfosuccinate in water | 2.0 |
| Water | 150.0 |
| Ammonium persulfate | 0.05 |

The mixture of styrene and glycidyl methacrylate is added over a period of 25 minutes to the water containing the ammonium persulfate and the dioctyl sodium sulfosuccinate, while stirring the latter and heating under reflux on a steam bath. Heating and stirring are continued for an additional 20 minutes, yielding a stable emulsion of copolymer. The conversion of monomers to a reactive copolymer is about 95%. If desired, all of the reactive copolymer may be coagulated as described under Examples 1 and 2. The properties of the dried, coagulated copolymer are approximately the same as the reactive copolymer of Example 16. It may be ground and molded under heat and pressure, alone or with a filler or other modifying agent, to yield molded articles of various shapes.

Example 18

| | Parts |
|---|---|
| Glycidyl methacrylate | 50.0 |
| Diallyl phthalate | 50.0 |
| Benzoyl peroxide | 0.5 |

The peroxide is dissolved in the mixture of monomers, and the resulting solution is heated on a steam bath. After heating for 1 hour a clear, colorless, homogeneous, rubbery, reactive gel has formed. Copolymerization is completed by heating the gel at 105° C. After heating at this temperature for a total of 21½ hours the clear casting of copolymer is hard, and it is insoluble in ethyl acetate and other organic solvents.

Example 19

| | Parts |
|---|---|
| Styrene | 360.0 |
| Glycidyl methacrylate | 30.0 |
| Glycidyl acrylate | 10.0 |
| 25% solution of dioctyl sodium sulfosuccinate in water | 40.0 |
| Water | 1160.0 |
| Ammonium persulfate | 0.2 |

The same procedure is followed as described under Example 1. The resulting emulsion of the reactive copolymer and the coagulated reactive copolymer (after separation from the aqueous phase, washing and drying) have characteristics similar to the corresponding products of Example 1.

Example 20

| | Parts |
|---|---|
| Triallyl cyanurate | 98.0 |
| Glycidyl methacrylate | 2.0 |
| Benzoyl peroxide | 2.0 | are thoroughly mixed. The resulting homogeneous solution is transferred to a glass cell and cured by heating at 80° C. for 21½ hours and then at 105° C. for 5 hours. The cast sheet is harder than a sheet prepared by similarly polymerizing triallyl cyanurate in the absence of glycidyl methacrylate.

Example 21

A

| | Parts |
|---|---|
| Methyl methacrylate | 75.0 |
| Glycidyl methacrylate | 25.0 |
| Benzoyl peroxide | 1.0 | are mixed and heated as described under Example 9 to yield a hard, clear, reactive copolymer of methyl methacrylate and glycidyl methacrylate as described under Example 9. This copolymer is pulverized and part of it is then used in making a filled, molding (moldable) composition as described below.

B

| | Parts |
|---|---|
| Reactive copolymer of A | 75.0 |
| Zinc stearate | 1.5 |
| Anthophyllite | 150.0 | are dry blended in a mixing machine for 6 hours and then homogenized and compacted by several passes through mixing rolls. The sheeted composition is ground to a size suitable for molding. A hard, well-cured, molded article is produced by molding a sample of the ground molding compound for 10 minutes at 150° C. under a pressure of 2000 pounds per square inch.

Example 22

Same as Example 21 with the exception that the reactive copolymer is produced by copolymerization of 95 parts of methyl methacrylate and 5 parts of glycidyl methacrylate. The molded article is not quite so hard as the molded article of Example 21.

Example 23

|  | Parts |
|---|---|
| Styrene | 80.0 |
| Glycidyl methacrylate | 20.0 |
| 25% solution of dioctyl sodium sulfosuccinate in water | 2.0 |
| Water | 150.0 |
| Ammonium persulfate | 0.05 |

The same procedure is followed as described under Example 17. A stable emulsion of reactive copolymer is obtained. The coagulated copolymer, in dry state, is a hard and brittle resinous material. It is heat-curable to a substantially insoluble, substantially infusible state as a result of polymerization through the epoxy groupings of the copolymer.

Example 24

|  | Parts |
|---|---|
| Methyl acrylate | 48.5 |
| Methyl methacrylate | 48.5 |
| Glycidyl methacrylate | 3.0 |
| Benzoyl peroxide | 1.0 | yield a hard, colorless, reactive copolymer containing epoxy groups when copolymerized in the same manner as described under Example 10.

Example 25

|  | Parts |
|---|---|
| 2,5-dichlorostyrene | 72.5 |
| Diallyl tetrafluorosuccinate | 22.5 |
| Glycidyl methacrylate | 5.0 |
| Lauroyl peroxide | 1.0 | are mixed together under anhydrous conditions, and the copolymerizable monomers in the resulting solution are copolymerized (also under anhydrous conditions) by heating the solution for 24 hours at 100° C. A solid copolymer having a good resistance to flame is obtained.

It will be understood, of course, by those skilled in the art that our invention is not limited to the specific ingredients named in the above illustrative examples nor to the particular proportions and methods of copolymerization mentioned therein. Thus, instead of benzoyl peroxide, lauroyl peroxide, hydrogen peroxide, ammonium persulfate or boron trifluoride-ethyl ether complex (boron trifluoride etherate), any other polymerization catalyst or combination of different polymerization catalysts, numerous examples of which have been given hereinbefore, may be used. Other catalysts that may be employed are other salts of per-acids, e. g., sodium and potassium persulfates, sodium and potassium percarbonates, sodium and potassium perborate, sodium and potassium perphosphates, etc. Also, instead of using the glycidyl ester or esters and the other comonomer or comonomers in the particular proportions given in the various examples, they may be used in any other proportions, for instance in the proportions mentioned by way of illustration in the portion of this specification prior to the examples.

A comonomer (or plurality of comonomers) which contains one or more $CH_2=C<$ groupings, which is different from the glycidyl ester and which is compatible and copolymerizable therewith, other than the particular comonomers given in the above illustrative examples, also may be employed. For instance, the comonomer may be a cyanoalkyl ester of an acrylic acid, e. g., mono-, di- and tri-cyanomethyl esters of acrylic acid, methacrylic acid, etc., the mono-, di- and tri-($\beta$-cyanoethyl) esters of acrylic acid, methacrylic acid, etc. On the comonomer may be any organic compound which is copolymerizable with the glycidyl ester and which is represented by the general formula

where R represents a member of the class consisting of hydrogen, halogen (chlorine, fluorine, bromine or iodine), alkyl (e. g., methyl, ethyl, propyl, butyl to octadecyl, inclusive), including cycloalkyl (e. g., cyclohexyl, etc.), aryl (e. g., phenyl, xenyl, naphthyl, etc.), alkaryl (e. g., tolyl, xylyl, ethylphenyl, etc.), aralkyl (e. g., benzyl, phenylethyl, etc.) and R' represents an aryl radical or a radical represented by the formula

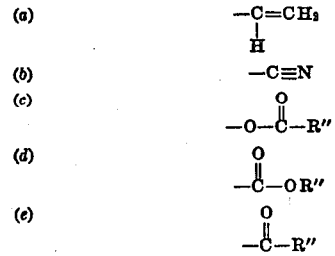

where R" represents an alkyl, alkoxyalkyl (e. g., methoxymethyl, methoxyethyl, ethoxyethyl, ethoxypropyl, propoxybutyl, etc.) or a carbocyclic radical (e. g., aryl, alkaryl, hydroaromatic, etc.). Examples of compounds embraced for Formula V are the vinyl esters (e. g., vinyl acetate, etc.), methyl vinyl ketone, isoprene, 1,3-butadiene, 2-chloro-1,3-butadiene, acrylonitrile, various esters of acrylic acid (e. g., methyl acrylate, ethyl acrylate, cyclohexyl acrylate, tetrahydronaphthyl acrylate, decahydronaphthyl acrylate, methoxyethyl acrylate, ethoxyethyl acrylate, etc.), as well as others that will be obvious to those skilled in the art.

The thermosetting or potentially thermosetting, reactive copolymers of this invention have a wide variety of applications. For instance, with or without a filler or other additive, numerous examples of which have been given hereinbefore, they may be used as molding compositions (or as components of molding composition) from which molded articles are produced by molding the composition under heat and pressure, e. g., at temperatures of the order of 120° C. to 200° C. and under pressures ranging between 1000 and 10,000 pounds per square inch. Among the fillers that may be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The liquid polymerizable compositions of our invention also may be employed in the production of castings; as adhesives, for instance in the production of optical devices containing a plurality of elements, examples of which are compound lenses, compound prisms, Nicol prisms, etc., and for various other purposes.

We claim:

A three-component copolymer of the following compounds in the specified weight ratios: 360 parts of styrene, 30 parts of glycidyl methacrylate and 10 parts of glycidyl acrylate.

JOHN G. ERICKSON.
WALTER M. THOMAS.

REFERENCES CITED

The following references are of record in the file of this patent:

UNITED STATES PATENTS

| Number | Name | Date |
|---|---|---|
| 2,089,569 | Orthner et al. | Aug. 10, 1937 |
| 2,129,666 | Barrett et al. | Sept. 13, 1938 |
| 2,335,813 | Stein | Nov. 30, 1943 |
| 2,462,354 | Brubaker | Feb. 22, 1949 |
| 2,470,324 | Staudinger et al. | May 17, 1949 |
| 2,476,922 | Shokal et al. | July 19, 1949 |
| 2,524,432 | Dorough | Oct. 3, 1950 |

FOREIGN PATENTS

| Number | Country | Date |
|---|---|---|
| 518,057 | Great Britain | Feb. 15, 1940 |

OTHER REFERENCES

Kester et al.: "Glycidyl Eesters of Aliphatic Acids," J. Org. Chem., 550–556 (1943).